United States Patent

Chmura

[15] 3,643,682
[45] Feb. 22, 1972

[54] POWER TRANSMISSION

[72] Inventor: Bernard J. Chmura, Clawson, Mich.

[73] Assignee: Sperry Rand Corporation, Troy, Mich.

[22] Filed: Oct. 26, 1970

[21] Appl. No.: 84,014

[52] U.S. Cl. ................................ 137/489, 251/26
[51] Int. Cl. ........................... F16k 31/12, F16k 17/38
[58] Field of Search ........... 137/489, 487.5, 624.11, 624.18, 137/469

[56] References Cited

UNITED STATES PATENTS

| | | | |
|---|---|---|---|
| 2,043,453 | 6/1936 | Vickers | 137/469 |
| 2,664,916 | 1/1954 | Conley | 251/26 |
| 2,707,970 | 5/1955 | Hughes | 137/489 |
| 3,479,003 | 11/1969 | Vollmer | 137/489 X |

Primary Examiner—M. Cary Nelson
Assistant Examiner—Robert J. Miller
Attorney—Van Meter and George

[57] ABSTRACT

A fluid pressure control system includes a pilot-operated main relief valve having a vent connection by which its relieving pressure is controlled. A series of pilot relief valves with individual bypassing valves are connected in a ladder network to the vent. Their individual pressure settings vary in binary increments and may be controlled by a digital process controller to select any one of a number of discreet pressure settings equal to two raised to a power represented by the number of pilot relief valves.

4 Claims, 1 Drawing Figure

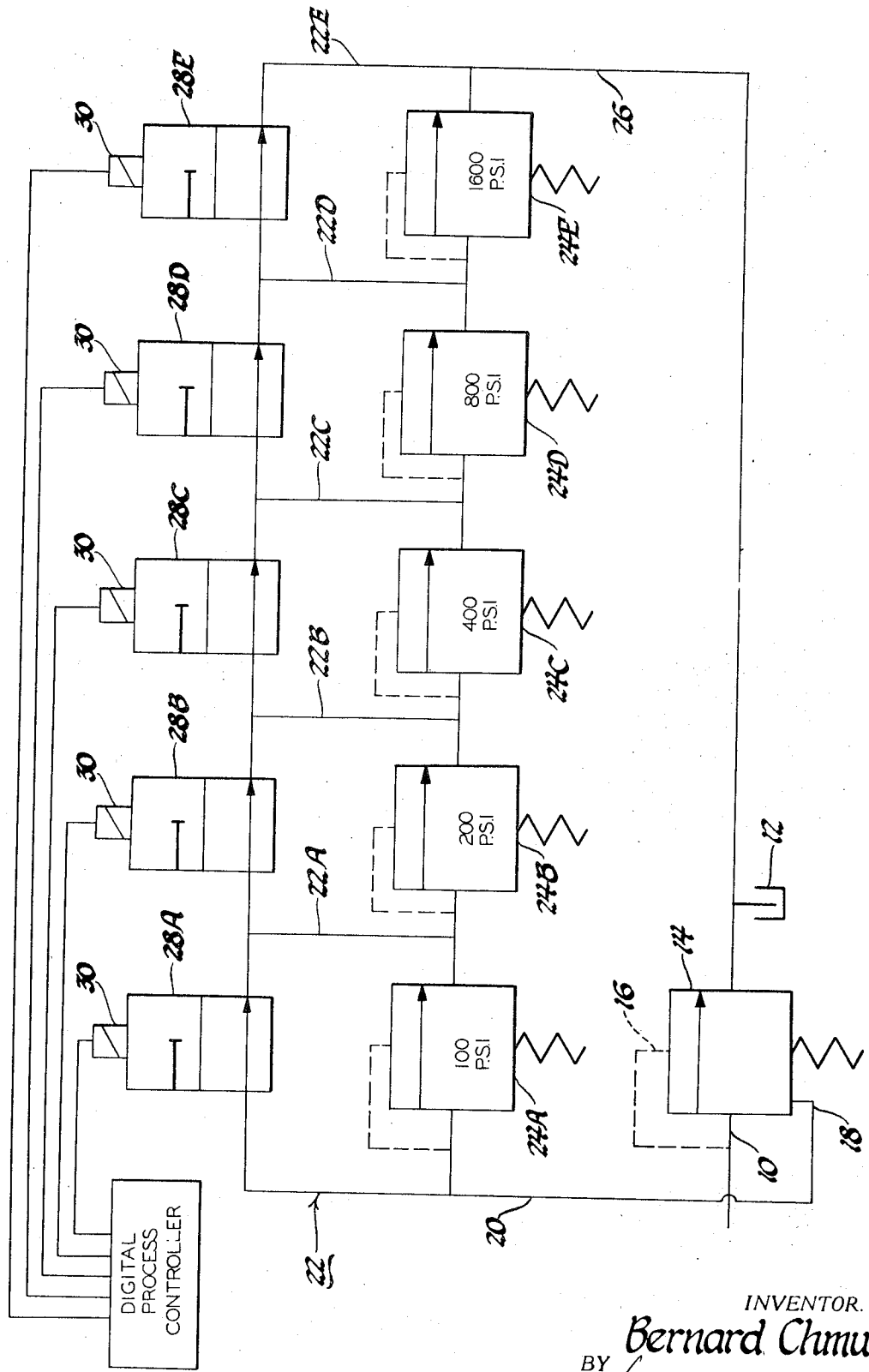

POWER TRANSMISSION

In hydraulic power systems for machine tools, presses and other various processing machinery, it is frequently desirable to control the pressure in the system in selectively available discreet pressure increments. This has heretofore been accomplished by providing a series of relief valves, either main valves or pilot valves controlling the main valve, together with selector means for rendering any one of the relief valves operative at a time. This requires as many relief valves as there are discreet pressure settings to be made available. Where a large number of such settings is necessary, this type of system becomes costly and cumbersome.

It is an object of the present invention to provide an improved fluid pressure control system in which a large number of discreet pressure settings are available selectively without requiring a large number of separate relief valves for this purpose.

This object is accomplished by the provision of a fluid pressure control system which consists in a pilot controlled main relief valve having a venting connection, the pressure in which may be varied to vary the pressure at which the main valve will relieve fluid, a plurality (N) of pilot relief valves having pressure settings selected in binary increments relative to each other, means forming a passage for fluid through all of the pilot relief valves in series, and means for selectively bypassing the pilot relief valves singly or in combination with others, whereby the main relief valve may be controlled to relieve at any of $2^N$ number of discreet pressure values differing by uniform steps equal to the value of the lowest pilot relief valve setting. In the drawing:

The single FIGURE is a circuit diagram of a pressure control system incorporating a preferred form of the present invention.

A hydraulic power system has a branch 10 leading from a point in the system such as the pump delivery line in which it is desired to vary the maximum pressure in a large number of discreet steps and has a reservoir 12 to which fluid relieved from the branch 10 may be returned for reuse in the system. Between branch 10 and reservoir 12, a main pilot relief valve 14 is connected having an internal pressure sensing connection indicated in dotted lines at 16, and an external vent connection, indicated at 18. The valve 14 may be of the type shown in Vickers' U.S. Pat. No. 2,043,453 or any other well-known type having the characteristic of regulating its relief pressure correlatively with the pressure at which pilot fluid is relieved through the vent 18.

A vent connection 20 leads to a ladder network, generally designated 22, in which a series of pilot relief valves and bypass valves are connected. Thus, the pilot relief valves 24A, 24B, 24C, etc., are connected in series in the lower leg of the ladder network 22, the right-hand end of which is connected by a line 26 to the reservoir 12. Similarly, a series of solenoid-operated two-way valves 28A, 28B, 28C, etc., are connected in series in the upper leg of the ladder network 22. Each of these valves is operated by a solenoid 30 which, when energized, will shift the valve, for example, from its open position to its closed position. These solenoids may be controlled in any suitable manner, either manually or from a digital process controller of any well-known suitable type.

The pressure settings of the pilot relief valve 24A, etc., are chosen to constitute an exponential binary progression as, for example, the values indicated on the drawing. The selection of these values will, of course, depend upon the discreet values desired and the size of the steps between one value and the next. Assuming the pilot relief valves have the indicated pressure settings and that there are five pilot relief valves in the system, the number of pressures available for controlling the vent connection 18 of the main relief valve 14 will be equal to $2^5$.

In operation, with all of the two-way valves open, the vent flow will take place freely through line 20 and the the upper leg of the ladder network 22 to the rung 22E and the return connection 26 causing the main valve 14 to open at a minimal pressure near zero. When valve 28A is closed, the vent fluid must pass from line 20 through valve 24A and rung 22A to reach the upper leg of the ladder network and thus a 100 p.s.i. pressure is maintained at the vent connection 18. When two-way valve 28B along is closed, the vent flow occurs through valve 28A, rung 22A, valve 24B, and rung 22B to the upper leg of the ladder network producing a 200 p.s.i. pressure at the vent 18.

For a 300 p.s.i. pressure setting, both valve 28A and 28B will be closed and the vent flow will have to pass through valve 24A and 24B in series, thus adding their respective pressure loads to the fluid exhausting from vent 18. Thus, it will be seen that by selectively closing various of the two-way valves 28, either singly or in various combinations, pressure settings of 100, 200, 300, 400, 500, etc., p.s.i. up to a maximum of 3,100 p.s.i. are available, including also the near zero pressure setting.

If this latter setting is not necessary, the two-way valve 28A may be omitted. If closer gradation between steps is desired, the addition of one more pilot relief and two-way valve to the ladder network will halve the interval between adjacent pressure settings as well as double the number of steps for a given maximum available pressure setting. Likewise reduction in size of the ladder network will widen the gradation. It will be understood that although the valves are shown only in diagrammatic form as individual valves, that they may be combined into one or more unitary bodies.

I claim:

1. A fluid pressure control system comprising a pilot-controlled main relief valve having a venting connection, the pressure in which may be varied to vary the pressure at which the main valve will relieve fluid, a plurality (N) of pilot relief valves having pressure settings selected in binary increments relative to each other, means forming a passage for fluid from said venting connection through all of the pilot relief valves in series, and means for selectively bypassing the pilot relief valves singly or in combination with others, whereby the main relief valve may be controlled to relieve at any of $2^N$ number of discreet pressure values differing by uniform steps equal to the value of the lowest pilot relief valve setting.

2. A system as defined in claim 1 wherein the selective bypassing means includes a plurality of at least N−1 two-way valves.

3. A system as defined in claim 2 wherein the pilot relief valves and the two-way valves are connected in the legs of a ladder network.

4. A system as defined in claim 2 wherein the two-way valves are solenoid operated.

* * * * *